United States Patent [19]
Wienberg et al.

[11] Patent Number: 5,916,651
[45] Date of Patent: Jun. 29, 1999

[54] ADHESIVE TAPE AND METHOD OF USING IT

[75] Inventors: Uwe Wienberg, Uetersen; Jens Nootbaar, Hamburg, both of Germany

[73] Assignee: Beiersdorf AG, Hamburg, Germany

[21] Appl. No.: 08/909,272

[22] Filed: Aug. 11, 1997

[30] Foreign Application Priority Data

Aug. 14, 1996 [DE] Germany ............................ 196 32 689

[51] Int. Cl.$^6$ ...................................................... B65H 19/18
[52] U.S. Cl. ..................... 428/40.1; 242/556; 242/556.1; 428/41.7; 428/41.8; 428/138; 428/212; 428/220; 428/343; 428/354; 428/355
[58] Field of Search ................................ 428/40.1, 41.7, 428/41.8, 212, 220, 343, 354, 138, 355; 242/556.1, 556

[56] References Cited

U.S. PATENT DOCUMENTS 5,348,793  9/1994  Stettner ..................................... 428/211
5,565,268 10/1996  Zajaczkowski ........................... 428/355
5,692,699 12/1997  Weirauch ................................ 242/556.1
5,702,555 12/1997  Caudal ..................................... 156/247

FOREIGN PATENT DOCUMENTS 418 527   3/1991  European Pat. Off. .
42 10 329 10/1993  Germany .
2294235   4/1996  United Kingdom .
91/08159   6/1991  WIPO .
95/29115  11/1995  WIPO .

*Primary Examiner*—Nasser Ahmad
*Attorney, Agent, or Firm*—Sprung Kramer Schaefer & Briscoe

[57] ABSTRACT

Adhesive tape for flying reel change with butted splice, in paper finishing machines, printing machines or the like, having a paper backing and a water-soluble self-adhesive composition, characterized in that the paper backing (2) is coated on both sides with a water-soluble self-adhesive composition (3) and in that the paper backing (2) consists of a readily splicing paper.

9 Claims, 1 Drawing Sheet

ADHESIVE TAPE AND METHOD OF USING IT

BACKGROUND OF THE INVENTION

1. Field of the Invention

The invention relates to an adhesive tape for flying reel change in paper finishing machines or the like, and to a method of using it in such machines.

2. Description of Related Art

Flying reel change in papermaking factories or the like is a common technique of replacing an almost fully discharged reel of paper by a new reel without the need to stop the machines, which run at high speed. This is done using double-sided self-adhesive tapes, known as splicing tapes, which firstly are of high adhesion and high tack but secondly, because of their water-soluble self-adhesive compositions and paper backing, do not interfere with the re-use of paper wastes in the paper-making machine. These splicing tapes are bonded artistically in a zig-zag form to the beginning of the web, a procedure requiring experienced personnel, with only about 4–5 minutes remaining for the entire procedure owing to the high speed of the machines.

Although this technology is well established, it is not without certain disadvantages. Thus experienced personnel are required, the procedure is automatically hectic, and the bonds are also relatively thick, since in each case two layers of paper and the adhesive splice in between are the result: a result which is unwanted in the paper industry.

There are various products on the market, known as splicing tapes, for this splicing operation in the course of flying reel change, which comprise in addition to a paper backing a water-soluble self-adhesive composition coated on both sides. Adhesive tapes of this kind are marketed inter alia under the name tesafix (Beiersdorf).

Thus EP 418 527 A2 describes a method of preparing a reel of printable material in web form for automatic reel changes and an adhesive strip suitable for this purpose which is divided into three zones. Of these, the middle zone is non-adhesive, which has a number of disadvantages in practice, such as in the case of the actual flying splice, where it is the cause of jerkiness, but also in the case of winding to form a reel of such an adhesive strip, and, finally, also in the case of mechanized attachment.

DE 42 10 329 A1 discloses an arrangement for connecting successive webs of paper that are wound to form reels, with appropriate adhesive strips. These strips too are constructed segmentally in zones; refer for instance to FIGS. 3–6.

SUMMARY OF THE INVENTION

The object of the invention was to remedy this situation and, in particular, to facilitate a thin bond in flying reel change while at the same time allowing this reel change to be carried out with more time, and also more processing time, yet while retaining the advantages achieved to date.

This object is achieved as set out in more detail in the claims.

The invention relates in particular to an adhesive tape for flying reel change with butted splice in paper finishing machines, printing machines or the like, having a paper backing and a water-soluble self-adhesive composition, characterized in that the paper backing (2) is coated on both sides with a water-soluble self-adhesive composition (3) and in that the paper backing (2) consists of a readily splicing paper.

Preference is given in this context to an adhesive tape where one of the self-adhesive compositions (3) has a cover (4).

Preference is given, furthermore, to an adhesive tape where the cover (4) is provided with a slit (5).

Preference is additionally given to an adhesive tape which is from 120 to 150 mm in width and in its overall thickness measures 100 to 250, in particular 100 to 150 $\mu$m.

Preference is also given to an adhesive tape where the slit (5) is provided at a distance of 20–40 mm from the edge of the adhesive tape (1).

Particular preference is given, furthermore, to an adhesive tape with a two part paper backing, as described in the subclaims.

The invention also relates to a method using adhesive tapes of this kind, namely a method of flying reel change with butted splice in a paper finishing machine, printing machine or the like, where an adhesive tape having a paper backing and a water-soluble self-adhesive composition is used, characterized in that an adhesive tape according to the invention is employed and bonds the back of part of the topmost web of a new reel of paper, while with its reverse side it bonds the underneath web of paper and thus secures the topmost web of paper, whereupon the new reel of paper is placed adjacent to an almost fully unwound reel of paper that is to be replaced and is accelerated to the same speed as the old reel, and then is pressed against it and so cut off or chopped off so that the exposed self-adhesive composition of the adhesive tape bonds in butted splice with the paper web of the old reel when the webs of paper are at essentially the same speeds, while at the same time the readily splicing paper backing splices in such a way that the two self-adhesive compositions with which it was coated are covered non-adhesively by the remains of said spliced paper backing.

In the context of this method it is preferred that first of all only the smaller part of the slitted cover is peeled off and the adhesive tape is bonded to the exposed part of the self-adhesive composition behind the topmost web of a new reel of paper, while the larger part of the cover is not peeled off until shortly before its use for flying reel change.

In accordance with the invention, the paper industry is offered the possibility of departing from the technique of end bonding used to date without giving up the advantages of that technique.

Indeed, on both technical and rationalization grounds, it is desirable to depart from the known technique of end bonding with double-sided reprocessable adhesive (splicing) tape in the course of automatic reel change on coating units. It is now possible to switch to a single-sided, reprocessable adhesive tape, with considerable advantages.

In this new bonding technology with an adhesive tape according to the invention, an advantageous procedure is to bond the underside of the topmost layer of paper (untreated paper) with a single-sided, covered, reprocessable adhesive tape about 120 mm in width (diagonally to the machine direction). The extent of underside bonding should be about 30 mm. Before this bonding, the covering paper, slitted or perforated to 30 mm, is peeled off. After the release paper has been peeled off about 90 mm still remain for the actual splicing operation.

The single-sided adhesive tape with the open adhesive-tape side outwards is now available for actual splicing, if any cover present is removed.

When accelerating the paper unwind it is necessary to hold the start of the paper (bond site) fast with the aid of a double-sided adhesive tape (reprocessable), as is achieved in accordance with the invention.

The advantages achieved in accordance with the invention lie, in particular, in the facts that the bond site is substantially thinner than previously (resulting in fewer paper breaks), that nonjerky splicing is made possible and that there is less machine downtime (increase in efficiency), since a break costs up to DM 30,000. The thickness of the bond site is advantageously low: currently 2 paper layers plus tesafix adhesive tape (adhesive tape thickness 0.085 mm), but according to the invention, for example, only 1 paper layer plus tesakrepp (adhesive tape thickness 0.088 mm). Finally, the bond site can be prepared outside the coating unit (rewinder). This results in a saving of personnel on the coating unit and then more time for implementing the bond site on the rewinder.

BRIEF DESCRIPTION OF THE DRAWINGS

In the text below the intention is to describe the invention in more detail with reference to an exemplary embodiment without wishing thereby to restrict it unnecessarily. In the drawings.

DETAILED DESCRIPTION OF A PREFERRED EMBODIMENT

Figure 1:
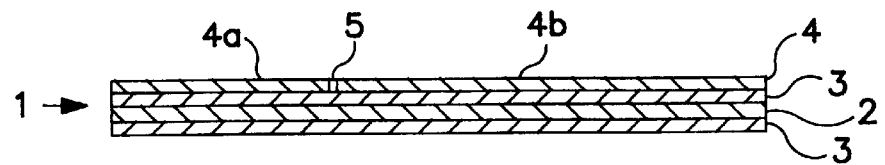
FIG. 1 shows a lateral, schematic view of an adhesive tape according to the invention.

In detail, FIG. 1 shows an adhesive tape 1 having a backing (2) made of crepe paper, coated on both sides with a water-soluble self-adhesive composition (3). The overall thickness of the backing (2) plus both self-adhesive compositions (3) is 0.140 mm and its width is 150 mm. The self-adhesive composition (3) is covered with a siliconized release paper (4) which is provided at a distance of 30 mm from its left-hand edge with a slit (5), so that the left-hand part of the release paper (4a) can be removed first and then the right-hand part (4b). The self-adhesive compositions (3) employed are in each case 50 $\mu$m layers of water-soluble acrylate adhesive composition, as are commercially available as tesa 51915. The cleavable paper backing employed is a 60 g/m² paper which cleaves in the middle.

Figure 2:
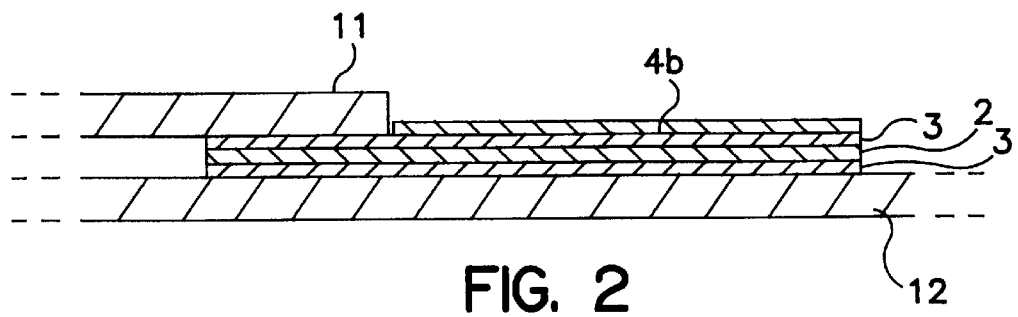
FIG. 2 shows a lateral, schematic view of an adhesive tape according to FIG. 1, bonded to a reel of paper and, except for the release paper, ready for a flying reel change.

FIG. 2 shows how such an adhesive tape (1) is bonded behind a paper web (11), namely by the left-hand part, the part (4a) of the release paper having been peeled off from this part, while the exposed self-adhesive composition (3) bonds to the paper web (12) of a reel of paper, the said web (12) lying below the paper web (11). The right-hand part (4b) of the release paper (4) is also peeled off, so that the paper reel thus equipped is ready for a flying reel change, the bond of the adhesive tape (1) extending obliquely over the reel in order to lessen a jerk at the moment of the flying reel change.

The upper self-adhesive composition (3) is now exposed and is ready for this flying change in butted splice, in a width of 120 mm and over the entire width of the reel of paper.

Figure 3:
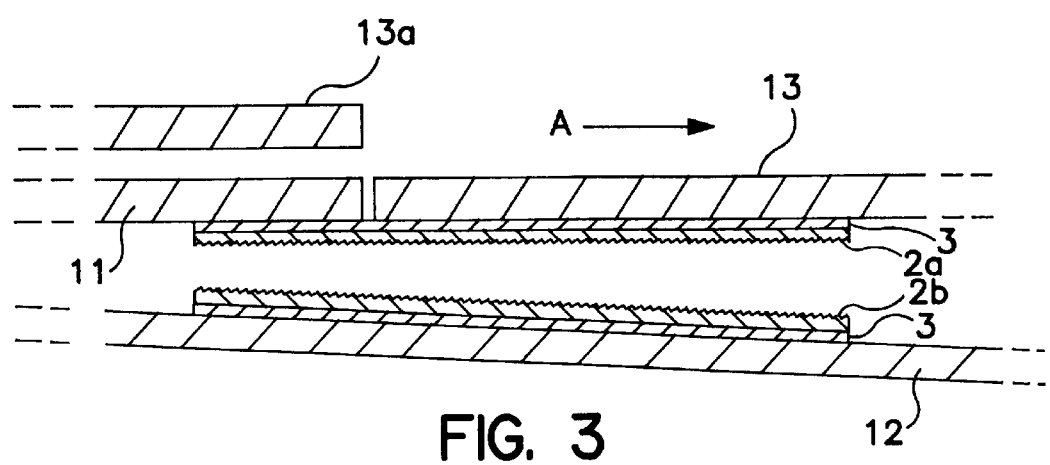
FIG. 3 shows a view according to FIG. 2 but after flying reel change has taken place.

The (new) reel of paper thus equipped is placed adjacent to the unwound (old) reel of paper to which the new reel is to be attached and is accelerated to the same rotary speed (arrow A) as the said old reel. When this has been done, the change can be executed: the new reel is brought up against the old one, the self-adhesive composition (3) bonds, in accordance with FIG. 3, to the paper web (13) of the old reel, while the old reel is chopped off (13a) and the readily splicing paper backing (2) splices in such a way that one part (2a) remains on the paper-web (11/13), where it covers the self-adhesive composition (3), while the other part (2b) remains on the paper web (12) and also covers the composition 3. Thus both self-adhesive compositions, (3), are to a certain extent neutralized, no longer adhere, and thus do not disrupt the subsequent process in the paper machines.

Figure 4:
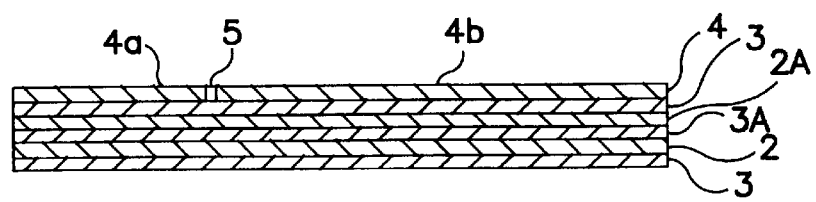
FIG. 4 shows a lateral, schematic view of a further, preferred embodiment of an adhesive tape according to the invention.

FIG. 4 shows a further embodiment, which is particularly appropriate when the adhesive tape is intended to withstand relatively high tensile forces. Once again, a cleavable paper backing (2) is provided, as described before, which can be cleaved in the middle and is about 60 g/m₂ coated on both sides with adhesive composition (3) and (3A) respectively: on the downwardly exposed side (3) with a thickness of 50 $\mu$m; upwards (3A) to a further paper backing (2A) with a thickness of 20 $\mu$m composition as described above. Laminated to the adhesive composition (3A) is a further paper backing (2A) of high tensile strength, a tissue paper or a nonwoven with a thickness of 35 or 50 $\mu$m respectively, on which there is located, in turn, a 50 $\mu$m layer of an adhesive composition (3) as described above, covered with release paper (4a) and (4b).

These variants with tissue paper backing are particularly suitable for tensile forces up to 800 N/cm; with nonwoven backing up to 1300 N/cm.

We claim:

1. A flying paper reel changes adhesive tape for use in making flying paper reel changes, said adhesive tape comprising:
   a) a cleavable paper backing;
   b) a first adhesive layer comprising a water-soluble self-adhesive composition coated on a first side of said paper backing;
   c) a second adhesive layer comprising a water-soluble selfadhesive composition coated on a second side of said paper backing; and
   d) a covering layer over said first adhesive layer, said covering layer being provided with a slit, thereby separating said covering layer into a first covering layer portion and a second covering layer portion;
   wherein said paper backing, when adhered between a new paper reel and an old paper reel to be replaced by said new paper reel, both of which are in motion, will cleave in two portions between said first and second adhesive layers such that a first portion of said cleaved paper backing will continue to adhere to and cover said first adhesive layer and a second portion of said cleaved paper backing will continue to adhere to and cover said second adhesive layer.

2. An adhesive tape according to claim 1, which is from 120 to 150 mm in width.

3. An adhesive tape according to claim 1, wherein the paper backing consists of a paper with a weight of 50–70 g/m².

4. An adhesive tape according to claim 3, wherein the paper backing consists of a paper with a weight of 60 g/m².

5. An adhesive tape according to claim 4, wherein the paper backing is made of crepe paper.

6. An adhesive tape according to claim 1, further comprising a second paper backing between said covering layer and said first adhesive layer, and a third adhesive layer comprising a water-soluble self-adhesive composition between said second paper backing and said covering layer.

7. An adhesive tape according to claim 6, wherein said second paper backing is made of tissue paper or a nonwoven.

8. A method of making a flying paper reel change comprising:
   a) providing an adhesive tape according to any one of claims 1–7;
   b) adhering a portion said first or third adhesive layers to an underside of a topmost web of a new reel of paper;
   c) adhering said second adhesive layer to a web of paper underneath said topmost web;
   d) accelerating the new reel of paper to the speed of an old reel of paper, which is already in motion and is to be replaced by said new reel of paper;
   e) adhering another portion of said first or third adhesive layers to an underside of a web of said old reel of paper and cutting said old reel of paper to create a butted splice bond between said old reel of paper and said new reel of paper, thereby effecting a flying paper reel change;

wherein a paper backing of said adhesive composition, when adhered between said new paper reel and said old paper reel, will cleave in two portions between said first and second adhesive layers such that a first portion of said cleaved paper backing will continue to adhere to and cover said first adhesive layer and a second portion of said cleaved paper backing will continue to adhere to and cover said second adhesive layer.

9. A method according to claim 8, wherein said first covering layer portion is removed to expose a portion of said first or third adhesive layers, and said exposed portion is adhered to the underside of said topmost web of the new reel of paper, and said second covering layer portion is removed at another time shortly before bonding of the new reel of paper to said old reel of paper, and the act of removing the second cover portion exposes another portion of said first or third adhesive layers, which is bonded to the underside of said web of said old reel of paper to create the butted splice bond between said new reel of paper and said old reel of paper.

* * * * *

UNITED STATES PATENT AND TRADEMARK OFFICE
CERTIFICATE OF CORRECTION

PATENT NO. : 5,916,651
DATED : June 29, 1999
INVENTOR(S) : Uwe WIENBERG, et al.

It is certified that error appears in the above-identified patent and that said Letters Patent is hereby corrected as shown below:

Column 4, line 40, cancel "selfadhesive" and substitute --self-adhesive--

Signed and Sealed this

Twenty-first Day of December, 1999

Attest:

Q. TODD DICKINSON

Attesting Officer

Acting Commissioner of Patents and Trademarks